United States Patent Office 3,264,252
Patented August 2, 1966

3,264,252
CURING A MONO-OLEFIN POLYMER-FILLER MIXTURE WITH A COMPOUND HAVING A QUINOID STRUCTURE
Donald B. Smith, Reading, and James C. MacKenzie, Wellesley Hills, Mass., assignors, by mesne assignments, to Polymer Dispersions, Inc., New York, N.Y., a corporation of Ohio
No Drawing. Filed Dec. 26, 1962, Ser. No. 247,374
20 Claims. (Cl. 260—41)

The present application is a continuation-in-part of applications Ser. Nos. 767,756, filed October 17, 1958, and 812,595, filed May 12, 1959, both now abandoned, application Ser. No. 767,756 being in turn a continuation-in-part of Ser. No. 762,277, filed September 22, 1958, now abandoned.

This invention relates to polymeric compositions and in particular to curable polymeric compositions having improved properties.

Essentially saturated long chain high molecular weight organic polymers, notably those formed by the polymerization of mono-olefinic hydrocarbons such as ethylene, propylene and α-butylene (n-butene-1) have of late achieved considerable commercial importance. These polymeric materials are currently being extensively used as insulation for wire and cable, in conduits, in containers, etc. The fabrication, molding, extrusion, and calendering of these materials is readily accomplished by standard methods. Despite all this, however, the applications of these polymers are circumscribed by their lack of high temperature form stability, that is, their inability to retain a particular shape at elevated temperatures, by their solubility in certain solvents, and by their relatively poor resistance to environmental stress cracking.

It has been found that the physical properties of such polymers can be greatly improved by the addition thereto of a minor amount, that is above about 0.1% by weight of the polymer, of a quinone oxime or a quinone oxime derivative such as p. quinone dioxime and diacetyl p. quinone dioxime and curing at temperatures above about 170° C. The hydrocarbon insolubility of the polymer is thereby greatly improved and the polymer has greatly increased resistance to creep and to stress cracking. When a filler such as carbon black is included, the tensile strength, yield strength, and temperature resistance of the polymer are also greatly increased. There seems to be no critical upper limit as to the amounts of oximes and oxime derivatives of the present invention that can be utilized, but about 10% by weight of the total composition would seem to be a practical upper limit because of economic considerations.

Accordingly, it is a principal object of this invention to produce improved polymer compositions.

Another object of this invention is to provide a novel class of curing agents for use in the curing of polymeric compositions.

Other objects of the invention will in part be obvious and will in part appear hereinafter.

The oximes and oxime derivatives contemplated by this invention are of the class of compounds having the formulation $R(NOR_1)_2$ in which R is an organic group having a quinoid structure and $R_1$ is hydrogen, a metal such as zinc or silver, or any organic grouping, for example, alkyl (such as methyl, tertiary butyl), aryl (such as phenyl), arylalkyl (such as cumyl), acyl (such as acetyl, lauroyl), or aroyl (such as benzoyl).

It is pointed out that the particular curing temperatures above about 170° C. that can be utilized in curing a particular polymeric composition are dependent in part upon the nature of the polymeric composition to be cured. Thus, it has been found that normally elastomeric compositions, i.e., compositions that can be stretched at room temperature to at least twice their original length and, after having been stretched and the stress removed, return with force to approximately their original length in a short time, normally cure at temperatures as low as about 170° C. On the other end, it has been found that normally plastomeric compositions, i.e., compositions that cannot be stretched at room temperature to at least twice their original length and, after having been stretched and the stress removed, return with force to approximately their original length in a short time, normally require temperatures above about 210° C. in order for substantial curing to occur.

In order to determine whether a particular composition was plastomeric or elastomeric, the following test was utilized:

One gram of the polymer or copolymer was shaken with 100 cc. of isooctane at 25° C. for seven days. At the end of that period, the weight of polymer that had dissolved was determined.

It was found that, in general, polymers and copolymers that were soluble to the extent of at least about 70% in the above test fulfilled the above definition of an elastomeric composition whereas polymers and copolymers that were soluble to the extent of less than about 70% fulfilled the above definition of a plastomeric composition.

Hereinafter follow a number of non-limiting illustrative examples. Unless otherwise stated, the degree of insolubility of the cured compounds in the following examples was the percentage of the polymer on the original polymer basis which remained undissolved after being extracted in diethylbenzene at 110° C. for twice the period of time necessary to completely dissolve the unmodified polymer. The degree of insolubility is accordingly regarded as being a substantially accurate measure of the extent of cross-linking that has taken place.

*Example 1*

A plastomeric composition comprising 100 parts by weight of "Alathon 10," a polyethylene polymer having a density of 0.92 and yield and weight tensile strengths at room temperature of about 1700 lb./in.$^2$, produced by E. I. du Pont de Nemours and Co. and two parts by weight of dibenzoyl p. quinone dioxime was cured for ten minutes at 225° C. The resulting composition was found to be 81% insoluble and had a yield strength of 2100 lb./in.$^2$ and a weight tensile strength of 2100 lb./in.$^2$ at room temperature.

*Example 2*

A plastomeric composition comprising 100 parts by weight of "Super Dylan 6200," a high density polyethylene polymer produced by Koppers Company, Inc., having a density of 0.96, 100 parts "Sterling" medium thermal carbon black and 5 parts dibenzoyl p. quinone dioxime was cured for 10 minutes at a temperature of 225° C. The uncured polymer at room temperature exhibited a yield strength of about 3300 lb./in.$^2$ and was 100% soluble in diethylbenzene. The resulting cured polymer was extracted for 16½ hours and found to be 60% insoluble on the uncured polymer basis and had a yield strength of about 4850 lb./in.$^2$ and a weight tensile strength of about 4850 lb./in.$^2$.

*Example 3*

A plastomeric composition comprising 100 parts of "Alathon 10," two parts dibenzoyl p. quinone dioxime, and two parts "Santonox," an antioxidant produced by Monsanto Chemical Company, was cured at 225° C. for 10 minutes. The resulting polymer was 67% insoluble.

*Example 4*

A plastomeric composition comprising by weight 100 parts of "Alathon 10," and two parts of diacetyl p. quinone dioxime was cured at 225° C. for 10 minutes. The resulting compound was found to be 72% insoluble. The same composition cured at 190° C. for 10 minutes was 100% soluble.

*Example 5*

A plastomeric composition comprising 100 parts of "Alathon 10," and two parts of dibenzoyl p. quinone dioxime was cured at 185° C. for 10 minutes. The resulting compound was found to be 100% soluble.

*Example 6*

A plastomeric composition comprising by weight 100 parts of "Alathon 10," and two parts of p. quinone dioxime dimethyl ether was cured at 265° C. for 10 minutes. The resulting compound was 52% insoluble.

*Example 7*

A plastomeric composition comprising by weight 100 parts of "R301C Moulding Powder," an isotactic polypropylene polymer produced by Hercules Powder Co., having a density of about 0.901, and two parts of dibenzoyl p. quinone dioxime was cured at 232° C. for 10 minutes. In this particular example the cured product was extracted for three hours at 145° C. The cured polymer was 25% insoluble.

*Example 8*

A plastomeric composition comprising by weight 100 parts of "Alathon 10," and two parts of the di-silver salt of p. quinone dioxime was cured at 225° C. for 10 minutes. The resulting compound was 76.5% insoluble.

*Example 9*

A plastomeric composition comprising by weight 100 parts of "Alathon 10," and two parts of the zinc salt of p. quinone dioxime was cured at 250° C. for 10 minutes. The resulting compound was 75% insoluble. The same composition cured at 190° C. for 10 minutes was 100% soluble.

*Example 10*

A plastomeric composition comprising by weight 100 parts of "Marlex 50," a high density polyethylene polymer produced by Phillips Petroleum Co., having a density of about 0.96, and 5 parts of dibenzoyl p. quinone dioxime was cured at 225° C. for 10 minutes. In this particular example the resulting cured compound was extracted for 16½ hours. The cured polymer was found to be 72% insoluble.

*Example 11*

A plastomeric composition comprising by weight 100 parts of "Alathon 10," 5 parts of dibenzoyl p. quinone dioxime and 100 parts of medium thermal carbon black was cured at 225° C. for 10 minutes. The resulting compound was 87% insoluble on a polymer basis.

*Example 12*

A plastomeric composition comprising by weight 100 parts of "Alathon 3," 100 parts of medium thermal carbon black and 2 parts of dibenzoyl p. quinone dioxime was cured at 225° C. for 10 minutes. The resulting compound was 85% insoluble on a polymer basis.

*Example 13*

A plastomeric composition comprising by weight 100 parts of "Marlex 50," 5 parts of dibenzoyl p. quinone dioxime and 100 parts of medium thermal carbon black was cured at 225° C. for 10 minutes. The resulting compound was 62% insoluble on a polymer basis.

*Example 14*

An elastomeric composition comprising by weight 100 parts of poly α-butylene produced by polymerizing α-butylene (n-butene-1) at a temperature of about 50° C. with a Ziegler-type catalyst comprising aluminum triisobutyl and titanium tetrachloride, and 5 parts of p. quinone dioxime was cured at 225° C. for 10 minutes. The resulting compound was found to be 47% insoluble.

*Example 15*

An elastomeric composition comprising by weight 100 parts of a copolymer of ethylene and α-butylene comprising 41.4% ethylene by weight which was produced by copolymerizing ethylene and α-butylene at a temperature of about 50° C. with a Ziegler-type catalyst comprising aluminum triethyl and titanium tetrachloride and having an intrinsic viscosity of 0.91, and 5 parts of dibenzoyl p. quinone dioxime was cured for 10 minutes at 225° C. The resulting compound was found to be 77.8% insoluble.

*Example 16*

An elastomeric composition comprising by weight 100 parts of a copolymer of ethylene and α-butylene comprising 37% ethylene by weight, produced by copolymerizing ethylene and α-butylene at a temperature of between about 41–50° C. with a Ziegler-type catalyst comprising titanium tetrachloride and aluminum triethyl, and having an intrinsic viscosity of 1.11, and 2 parts of dibenzoyl p. quinone dioxime was cured for 10 minutes at 225° C. The resulting compound was found to be 59.2% insoluble.

*Example 17*

An elastomeric composition comprising by weight 100 parts of a copolymer of ethylene and α-butylene comprising 62% ethylene by weight, produced by copolymerizing ethylene and α-butylene at a temperature of about 70–86° C. with a Ziegler-type catalyst comprising titanium tetrachloride and aluminum triethyl, having an intrinsic viscosity of 1.14 and two parts of dibenzoyl p. quinone dioxime was cured for 10 minutes at 225° C. The resulting compound was found to be 86.5% insoluble.

*Example 18*

An elastomeric composition comprising 100 parts of a polymer of α-butylene which was produced by polymerizing at a temperature of about 50° C. with a Ziegler-type catalyst comprising titanium tetrachloride and aluminum triethyl, and 5 parts of dibenzoyl p. quinone dioxime was cured for 10 minutes at 225° C. The resulting compound was found to be 16.8% insoluble.

*Example 19*

The composition of Example 18 was cured for 10 minutes at 160° C. The resulting compound was found to be completely soluble.

*Example 20*

An elastomeric composition comprising by weight 100 parts of a copolymer of ethylene and α-butylene comprising 40% ethylene by weight which was produced by copolymerizing ethylene and α-butylene at a temperature of about 70° C. with a Ziegler-type catalyst comprising titanium tetrachloride and aluminum triethyl and 5 parts of dibenzoyl p. quinone dioxime was cured for 15 minutes at 225° C. The resulting compound was found to be 57.4% insoluble.

*Example 21*

An elastomeric composition comprising by weight 100 parts of a copolymer of ethylene and propylene which was produced by copolymerizing ethylene and propylene at a temperature of about 90–100° C. with a Ziegler-type catalyst comprising titanium tetrachloride and aluminum triisobutyl, and had an intrinsic viscosity of 0.31 and 5 parts of dibenzoyl p. quinone dioxime was cured for 10 minutes at 225° C. The resulting compound was 13.5% insoluble.

*Example 22*

An elastomeric composition comprising by weight 100 parts of a highly atactic copolymer of ethylene and propylene comprising 40% ethylene by weight which was produced by copolymerizing ethylene and propylene at a temperature of about 55° C. with a Ziegler-type catalyst comprising aluminum triethyl and titanium tetrachloride, and 5 parts of di-p-toluoyl quinone 1,4-dioxime was cured for 10 minutes at 225° C. The resulting compound was found to be 22.1% insoluble.

*Example 23*

An elastomeric composition comprising by weight 100 parts of a copolymer of propylene and α-butylene comprising 25% propylene by weight which was produced by copolymerizing propylene and α-butylene at a temperature of about 5° C. with a Ziegler-type catalyst comprising aluminum triisobutyl and titanium tetrachloride, and had an intrinsic viscosity of 1.47, and 5 parts of di-p-toluoyl quinone 1,4-dioxime was cured for 10 minutes at 225° C. The resulting compound was found to be 23.1% insoluble.

*Example 24*

An elastomeric composition comprising by weight 100 parts of a copolymer of ethylene and α-butylene comprising about 41.4% ethylene by weight and having an intrinsic viscosity of 0.91, which copolymer was produced by copolymerizing ethylene and α-butylene at a temperature of about 50° C. with a Ziegler-type catalyst comprising aluminum triethyl and titanium tetrachloride, 50 parts of "Vulcan 3," an oil furnace carbon black produced by Cabot Corp., and 5 parts of p. quinone dioxime was cured for 10 minutes at 225° C. The resulting compound was found to be 25.3% insoluble.

*Example 25*

An elastomeric composition comprising by weight 100 parts of a highly atactic copolymer of ethylene and propylene comprising 40% ethylene by weight, which was produced by copolymerizing ethylene and propylene at a temperature of about 55° C. with a Ziegler-type catalyst comprising aluminum triethyl and titanium tetrachloride, 50 parts of "Cab-O-Sil," a fine particle size pyrogenic silica produced by Cabot Corp., and 5 parts of dibenzoyl p. quinone dioxime was cured for 10 minutes at 225° C. The resulting compound was found to be 43% insoluble.

*Example 26*

An elastomeric composition comprising by weight 100 parts of a highly atactic copolymer of ethylene and propylene comprising 40% ethylene by weight, which was produced by copolymerizing ethylene and propylene at a temperature of about 55° C. with a Ziegler-type catalyst comprising aluminum triethyl and titanium tetrachloride, 50 parts of "Hi-Sil 233," a precipitated silica having a particle size of about 22 millimicrons which is produced by Columbia-Southern Chemical Corporation, 5 parts of dibenzoyl p. quinone dioxime and 5 parts of zinc stearate was cured for 10 minutes at 225° C. The resulting compound was found to be 24.4% insoluble.

As previously mentioned, the yield strength, the tensile strength, and the temperature resistance of the above discussed polymers are greatly increased when a filler or pigment is utilized. The preferred filler is carbon black but other fillers such as finely-divided metal and metalloid oxides, metal silicates, wood flour, and many others are also suitable for the purposes of the instant invention.

It should be pointed out that the quinone oximes and their derivatives are particularly suitable for the strengthening of the high-melting polymers, for example, of ethylene and propylene which has recently been developed. Cross-linking agents suitable for the strengthening of low-melting polymers have been known for some time. However, the new high-melting polymers recently developed require milling at considerably higher temperatures than is necessary with the low-melting polymers. Accordingly, most of the curing agents that were known heretofore such as the aralkyl peroxides which decompose at temperatures sufficiently high to allow their being milled into the low-melting polymers without effecting premature and therefore non-uniform curing, are generally not suitable for use as curing agents for these high-melting polymers because they decompose at temperatures that are too low. The quinone oximes and derivatives thereof of the present invention, however, normally effect curing only at temperatures above about 170° C. in the case of elastomeric compositions and above about 210° C. in the case of plastomeric compositions. Accordingly, the curing agents of the present invention are completely suitable for use in the curing of high-melting polymers.

The curing agents of the present invention have in at least one very important aspect a definite advantage over prior art curing agents as regards their use in low-melting polymer compositions also. When low-melting polymer compositions are used in conventional extruding apparatus, for example, in the production of cured polyethylene tubing, the rate of extrusion is very highly dependent upon the viscosity of the molten composition being extruded. Accordingly, heretofore, extrusion rates were distinctly limited because, due to the low decomposition temperature of the prior art curing agents, the temperature of the molten composition could not be increased (and the viscosity accordingly lowered) without causing premature curing of the composition in the extruder. By the use of the curing agents of the present invention, however, this severe limitation is completely overcome because the curing agents of the present invention can be heated to substantially higher temperatures before undergoing decomposition. Accordingly, extrusion rates can be greatly increased.

Obviously, many changes may be made in the above specifically disclosed formulations without departing from the scope of the invention. For example, in addition to those oximes expressly mentioned above as being suitable, many others such as p. quinone dioxime diphenyl ether and diphenyl p. quinone dioxime, are also suitable.

Also, in addition to the above-mentioned components, the compositions of the present invention may contain any of the many additives, such as antioxidants, normally utilized in compositions of the type encompassed by the present invention.

Also compounds which can be transformed in situ to quinoid oximes or their derivatives would also be suitable for the practice of the present invention. Accordingly, it is intended that such compounds be included within the scope of the appended claims.

In addition to polyethylene, polypropylene, poly α-butylene, other polymers and copolymers and mixtures thereof, can also be utilized in the practice of this invention. Therefore, it is intended that the disclosure of specific materials be regarded as illustrative and as in no way limiting the scope of the invention.

What we claim is:

1. A process for improving the high temperature properties of a polymeric material chosen from the group consisting of the homopolymers of the aliphatic mono-olefinic hydrocarbon monomers and mixtures thereof, copolymers formed from the aliphatic mono-olefinic hydrocarbons, and mixtures thereof, so as to produce a material having exceptional flexibility and strength, which process comprises compounding said polymeric material with a curing agent consisting of above about 0.1% by weight of said polymeric material of a compound having the formulation $$R(NOR_1)_2$$

wherein R is an organic group having a quinoid structure, and $R_1$ is chosen from the group consisting of hydrogen, a metal which permits curing activity by said compound upon heating, and an organic grouping chosen from the group consisting of alkyl, aryl, arylalkyl, acyl, or aroyl, and curing the resulting mixture at a temperature above about 210° C.

2. The process of claim 1 wherein said polymeric material comprises polyethylene.

3. The process of claim 1 wherein said polymeric material comprises polypropylene.

4. The process of claim 1 wherein said polymeric material comprises poly α-butylene.

5. The process of claim 1 wherein said curing agent is chosen from the group consisting of p. quinone dioxime, dibenzoyl p. quinone dioxime, p. quinone dioxime dimethyl ether, diacetyl p. quinone dioxime, the di-silver salt of p. quinone dioxime, the zinc salt of p. quinone dioxime, and di-p-toluoyl quinone 1,4-dioxime.

6. The process of claim 1 wherein said curing agent is p. quinone dioxime.

7. The process of claim 1 wherein said curing agent is dibenzoyl p. quinone dioxime.

8. The process of claim 1 wherein said polymeric material is elastomeric.

9. The process of claim 1 wherein said polymeric material is plastomeric.

10. A process for improving the high temperature properties of a polymeric material chosen from the group consisting of the homopolymers of the aliphatic mono-olefinic hydrocarbon monomers and mixtures thereof, copolymers formed from the aliphatic mono-olefinic hydrocarbons, and mixtures thereof, so as to produce a material having exceptional flexibility and strength, which process comprises compounding said polymeric material with a filler and a curing agent consisting of above about 0.1% by weight of said polymeric material of a compound having the formulation $$R(NOR_1)_2$$

wherein R is an organic group having a quinoid structure, and $R_1$ is chosen from the group consisting of hydrogen, a metal which permits curing activity by said compound upon heating, and an organic grouping chosen from the group consisting of alkyl, aryl, arylalkyl, acyl, or aroyl, and curing the resulting mixture at a temperature above about 210° C.

11. The process of claim 10 wherein said filler comprises carbon black.

12. The process of claim 10 wherein said filler comprises silica.

13. The process of claim 10 wherein said compound having the formulation $$R(NOR_1)_2$$

comprises a compound chosen from the group p. quinone dioxime, dibenzoyl p. quinone dioxime, p. quinone dioxime dimethyl ether, diacetyl p. quinone dioxime, the di-silver salt of p. quinone dioxime, the zinc salt of p. quinone dioxime, and di-p-toluoyl quinone 1,4-dioxime.

14. The process of claim 10 wherein said curing compound is p. quinone dioxime.

15. The process of claim 10 wherein said curing compound is dibenzoyl p. quinone dioxime.

16. The process of claim 10 wherein said polymeric material comprises polyethylene.

17. The process of claim 10 wherein said polymeric material comprises polypropylene.

18. The process of claim 10 wherein said polymeric material comprises poly α-butylene.

19. The process of claim 10 wherein said polymeric material is elastomeric.

20. The process of claim 10 wherein said polymeric material is plastomeric.

References Cited by the Examiner

UNITED STATES PATENTS

| 2,748,104 | 5/1956 | Viohl | 260—41 |
| 2,888,424 | 4/1959 | Precopio et al. | 260—41 |
| 2,983,714 | 5/1961 | Robinson | 260—41 |
| 3,012,020 | 12/1961 | Kirk et al. | 260—41 |

MORRIS LIEBMAN, *Primary Examiner.*

A. LIEBERMAN, K. B. CLARKE, *Assistant Examiners.*